P. M. ORLOPP.
FUEL CONNECTION FOR INTERNAL COMBUSTION ENGINES.
APPLICATION FILED NOV. 30, 1912.
1,159,985.
Patented Nov. 9, 1915.
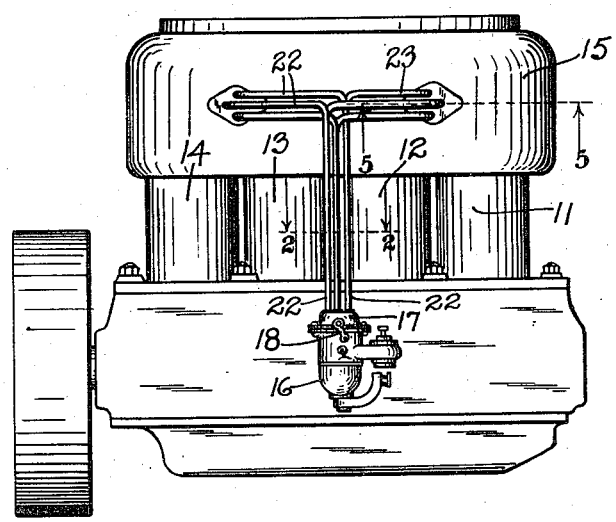
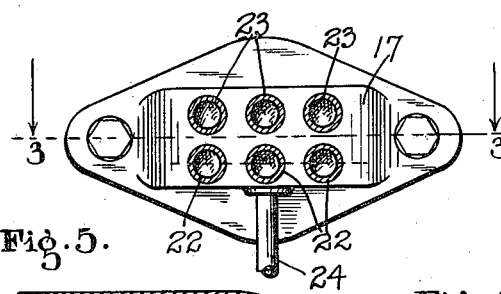
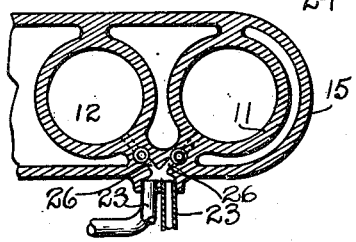
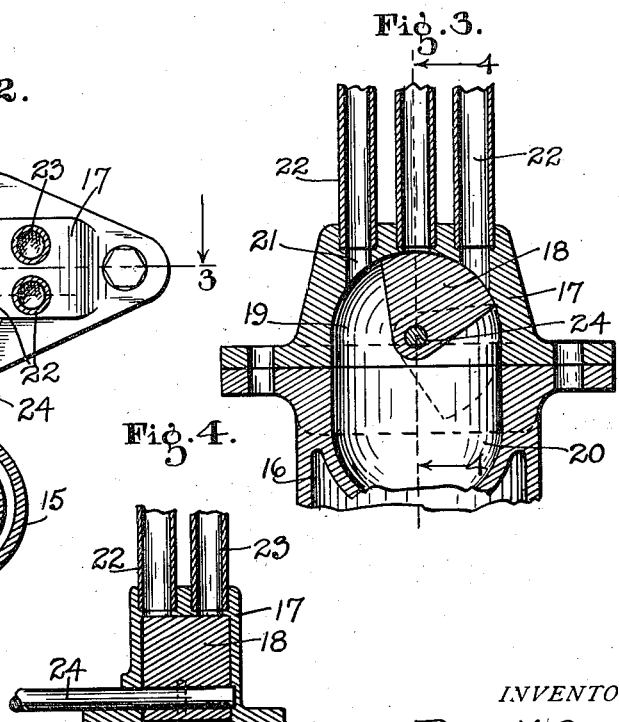
WITNESSES:
Arthur H Edgerton
O. M. McLaughlin
INVENTOR.
Platt M. Orlopp.
BY
V. H. Lockwood.
ATTORNEY.

UNITED STATES PATENT OFFICE.

PIATT M. ORLOPP, OF INDIANAPOLIS, INDIANA.

FUEL CONNECTION FOR INTERNAL-COMBUSTION ENGINES.

1,159,985.

Specification of Letters Patent.

Patented Nov. 9, 1915.

Application filed November 30, 1912. Serial No. 734,304.

*To all whom it may concern:*

Be it known that I, PIATT M. ORLOPP, a citizen of the United States, and a resident of Indianapolis, county of Marion, and State of Indiana, have invented a certain new and useful Fuel Connection for Internal-Combustion Engines; and I do hereby declare that the following is a full, clear, and exact description thereof, reference being had to the accompanying drawings, in which like numerals refer to like parts.

The object of this invention is to improve the construction of internal combustion engines with particular reference to the means for supplying gaseous fuel thereto so that the gaseous fuel will not condense in or on the wall of the conduit or conduits leading to the cylinders of the engine. Such condensation of the fuel is a serious difficulty in the operation of internal combustion engines.

The chief feature of the invention consists in omitting the usual manifold and providing a plurality of small tubes or conduits leading directly to the cylinders from the carbureter, the throttle valve of which controls the passage of gaseous fuel through said tubes or conduits. This arrangement causes each cylinder on the suction stroke of the piston therein to draw fuel directly from the carbureter through said small tube or tubes so that the fuel will not linger in any chamber intermediate the carbureter and cylinder and wherein it may condense. Thus, in an ordinary manifold, the suction stroke of the piston in one cylinder draws gaseous fuel from the entire chamber of the manifold and the fuel does not pass directly from the carbureter into the cylinder. The tubes or conduits are of such small capacity that it can be said that nearly all of the gaseous fuel entering the cylinder on the suction stroke of the piston thereof has come immediately from the carbureter and without lingering or being chambered between the carbureter and the cylinder.

The full nature of the invention will be understood from the accompanying drawings and the following description and claims.

In the drawings, Figure 1 is an elevation of an internal combustion engine provided with my invention. Fig. 2 is a section on the line 2—2 of Fig. 1, on an enlarged scale. Fig. 3 is a vertical section on the line 3—3 of Fig. 2, the lower part of the carbureter being broken away. Fig. 4 is a section on the line 4—4 of Fig. 3. Fig. 5 is a section on the line 5—5 of Fig. 1.

In the drawings there is shown an internal combustion engine of common type having cylinders 11, 12, 13 and 14.

15 is the usual water jacket.

16 is the carbureter which may be of usual type excepting that the upper end includes a valve cap 17 for the throttle valve 18. This cap 17 has in it a chamber 19 in which the valve is mounted and which chamber is in communication with the mixing chamber 20 of the carbureter. The cap 17 has six ports 21 from which three tubes 22 and three tubes 23 lead upward to the cylinders of the engine. These tubes are arranged in pairs, one tube 23 being located directly behind such tube 22, and the throttle valve 18 is the segment of a cylinder mounted on a lever shaft 24 so that when said shaft is oscillated, the valve 18 will be oscillated. The outer surface of the valve 18 is curved concentric with its axis and coöperates with the upper surface of the chamber 19 which is also curved concentric with the axis of the valve. Said valve 18 fits snugly against the wall of the chamber 19 and, therefore, in one position is enabled to close all of the ports 21, but when moved somewhat will uncover the first two of said ports, which will permit fuel to pass through one of the tubes 22 and the tube 23 behind it. If the valve is operated somewhat further, it will open another pair of said ports and if operated still further to the dotted line position shown in Fig. 3, it will open all of said ports. This enables the operator to control and predetermine the number of ports of said carbureter which shall be opened for the passage of fuel. One tube of each pair, the tube 22, is bent to the left at the upper end and is in communication with the two cylinders 13 and 14 and the other tubes behind, 23, are bent to the right and are in communication with the cylinders 11 and 12. Said tubes or conduits are divided when they almost reach the cylinders into two conduits 26 which directly enter the cylinders, as shown in Fig. 5. Thus, there is no chamber of any material size lying between the carbureter and the cylinder, but merely a gas passageway and the tubes or conduits 26 are located in a position where they will always be heated to some extent so that condensation will be prevented there, but the point of the invention is that the conduit from the carbureter to each cylinder is so very small that on the suction stroke of the piston of the cylinder, the cylinder will be charged by gaseous fuel nearly all of which is drawn directly and immediately from the carbureter. The cylinder will take all of the fuel which happens to be in the tube, but that constitutes such a small portion of the total charge, that what is stated above is substantially correct. The capacity of a tube 22 or 23 is but a very small fraction of the capacity of the cylinder.

Since the cylinder draws its fuel directly from the carbureter into the cylinder instead of from a chamber between the carbureter and the cylinder in which the fuel may linger after it has left the carbureter and before it enters the cylinder, there will be no opportunity for condensation and there will be such a strong and sudden sweep of fuel through the tubes 22 and 23 that any fuel which might condense on the walls thereof will be swept into the cylinder. This keeps the tubes entirely clear. Furthermore, the tubes leading to the different pairs of cylinders, separate right at the carbureter so that the cylinder 11 or 12 will never draw fuel from the tubes 22 which lead to the other two cylinders, as is common in manifolds, because the chambers in the manifold are in communication with each other and a cylinder may be charged with gas drawn from some remote part of the manifold, some time after it has left the carbureter. This will be more clear and striking when we consider an arrangement wherein there is only one tube 22 and one tube 23, as would be the case when the throttle valve is in the position shown in Fig. 3. Another effect of providing a number of tubes or conduits 22 and 23 and arranging the throttle valve so that a part of it can be cut off, is that when the engine is starting and the suction of the piston is slow, then only one pair of tubes will be opened, as shown in Fig. 3, so that although the demand for fuel is less, still the sweep of fuel through said tubes will be just as strong as if all of the tubes were open while the engine was running at full speed and when the suction and demand for fuel is, therefore, relatively greater. It is seen, therefore, that with this device, the cylinders will be supplied almost directly from the carbureter without the gaseous fuel lingering in transit and hence, the conduits between the carbureter and cylinders will be kept clear and may be controlled to that extent.

I claim as my invention:

1. A plurality of pairs of cylinders for internal combustion engines, a single carbureter for said cylinders having a valve chamber in communication therewith, a plurality of conduits leading from said valve chamber to each pair of cylinders, the conduits for the different pairs of cylinders being arranged beside each other and with the conduits of each pair of cylinders in a separate row, and a valve adapted to cover all of said rows of conduits and successively, simultaneously and similarly open and close the corresponding conduits in all of said rows.

2. In combination with an internal combustion engine, a plurality of pairs of cylinders, a carbureter, a chambered cover for said carbureter, a valve eccentrically mounted in said cover, a plurality of rows of ports, in said cover, tubes leading from said ports to said cylinders, one of said tubes of each row passing to each pair of cylinders and said aforesaid valve being capable of successively opening and closing each row of ports.

In witness whereof, I have hereunto affixed my signature in the presence of the witnesses herein named.

PIATT M. ORLOPP.

Witnesses:
J. H. WELLS,
O. M. McLAUGHLIN.